United States Patent [19]
Willasch et al.

[11] 3,823,322
[45] July 9, 1974

[54] PHOTOGRAPHIC FILM HANDLING APPARATUS FOR CHARGED-PARTICLE BEAM EQUIPMENT

[75] Inventors: Dieter Willasch, Gluckweg; Bernd Schiewe, Uhlandstr; Volker Rindfleisch, Stanzer, all of Germany

[73] Assignee: Siemens Aktiengesellschaft, Munich, Germany

[22] Filed: Nov. 30, 1972

[21] Appl. No.: 310,877

[30] Foreign Application Priority Data
Nov. 30, 1971 Germany............................ 2160052

[52] U.S. Cl............... 250/469, 250/311, 250/397, 250/470
[51] Int. Cl....................... H01j 37/26, G01n 23/00
[58] Field of Search........... 250/306, 307, 309, 311, 250/397, 468, 469, 470

[56] References Cited
UNITED STATES PATENTS
| | | | |
|---|---|---|---|
| 1,140,877 | 5/1915 | Cocanari............................ | 250/470 |
| 3,090,864 | 5/1963 | Takahashi et al.................. | 250/311 |
| 3,345,514 | 10/1967 | Komoda............................ | 250/311 |

FOREIGN PATENTS OR APPLICATIONS
| | | | |
|---|---|---|---|
| 1,291,986 | 4/1969 | Germany........................... | 250/468 |
| 692,751 | 6/1953 | Great Britain..................... | 250/311 |

Primary Examiner—William F. Lindquist
Attorney, Agent, or Firm—Kenyon & Keynon Reilly Carr & Chapin

[57] ABSTRACT

Improved photographic film handling apparatus for use whth charged-particle beam equipment, such as electron microscopes, permits either photographic recording or direct viewing on a picture screen without removing the film handling apparatus from the beam path. The apparatus includes film supply means, a transport mechanism mounted in the beam path, and exposed film storage means. The photographic film, or other picture recording medium, is arranged in consecutive picture areas, each separated by a space sufficient to permit at least part of the charged-particle beam to pass through a matching opening in the transport mechanism for reception by a direct view fluorescent viewing screen or by a television camera for multi-station remote viewing. The recording medium can be either in conventional roll film form, with openings cut in the film between consecutive picture areas, or in plate form, with the plates mounted on a link-type carrier having joints in the regions between the recording plates.

5 Claims, 4 Drawing Figures

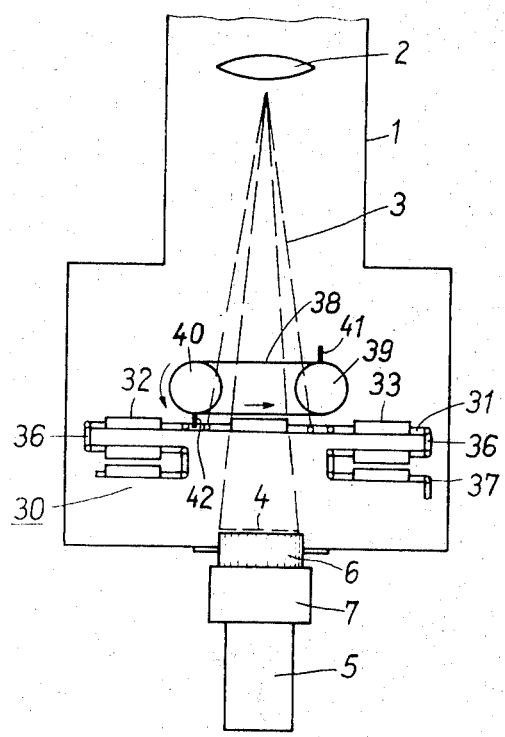
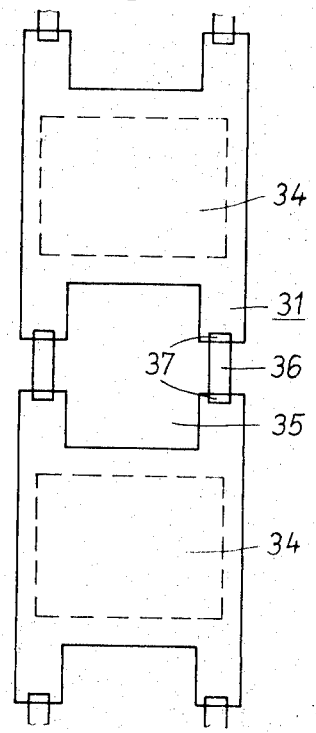
Fig. 3
Fig. 4

PHOTOGRAPHIC FILM HANDLING APPARATUS FOR CHARGED-PARTICLE BEAM EQUIPMENT

BACKGROUND OF THE INVENTION

1. Field of the Invention

This invention relates to photographic film handling apparatus, particularly to film handling apparatus for use in charged-particle beam equipment such as electron microscopes.

2. Description of the Prior Art

In operating electron microscopes or similar charged-particle beam equipment it is customary to observe the image produced on a picture screen and then to make a permanent record of selected views on photographic film or other recording media. Normally the picture screen is a direct-view fluorescent screen, but a television camera may be used instead; so that the picture can be displayed on both local and remote television screens. In either case, the fluorescent screen or the television camera is placed in the path of the charged-particle beam and the entire system enclosed in a vacuum chamber.

To obtain photographic recordings directly from the charged-particle beam the usual practice is to arrange film handling apparatus similar to that of a conventional roll film camera in the vacuum chamber. This appratus typically includes film supply means, a film transport mechanism, and storage means for exposed film. The roll of film is advanced through the transport mechanism from the supply means to the storage means in stepwise increments, the length of each increment corresponding to the size of a picture area on the film. The picture areas are thus arranged consecutively and adjacent to one another, just as in a conventional camera.

The film handling apparatus is normally mounted in the vacuum chamber so that the transport mechanism can be positioned directly in the beam path when making photographic recordings and can be swung out of the way when viewing the image on the picture screen. Although this arrangement provides flexibility of choice between direct viewing and photographic recording, it has the serious drawback of requiring a substantially enlarged vacuum chamber to accomodate the film handling apparatus when it is swung out of the beam path. In addition, movable supporting means must be provided that can be controlled from outside the vacuum chamber.

SUMMARY OF THE INVENTION

It is an object of the present invention to provide improved photographic film handling apparatus of the simplest possible design, which can be positioned permanently in the beam path, and yet which will provide complete flexibility either to observe the projected image on the picture screen or to make photographic recordings.

It is a further object of the invention to provide photographic film handling apparatus in the vacuum chamber of charged-particle beam equipment that can accomodate flat film or film plates.

These objects are achieved by the apparatus of the invention which includes the conventional film supply means, film transport mechanism and storage means for the exposed film. The improvement of the invention comprises carrier means for delivering consecutive sections of recording medium corresponding to single picture areas from the film supply means in response to actuation of the transport mechanism and for arranging successive sections so that they are separated by a space sufficient to pass at least a part of the charged-particle beam through a matching opening in the transport mechanism for reception by a direct view fluorescent screen, television camera, or other viewing device.

In this way, the transport mechanism can be positioned permanently in the beam path before the viewing sensor. Direct viewing is possible at all times when the carrier means is positioned so that a space between successive picture areas is aligned with the opening in the transport mechanism. Whenever the operator wishes to record the image, he actuates the transport mechanism to advance the carrier means until the next section of recording medium (e.g. photographic film) is positioned in the beam path. If desired, he can make consecutive recordings without directly viewing the images by advancing the carrier means each time by an amount equal to the spacing of consecutive picture area film sections.

For roll film photography, the carrier means can comprise the film strip itself, with punched-out windows alternating with each section of film corresponding to a picture area. This film strip can be fed in the usual manner past a picture stage in the transport mechanism, the picture stage having a cutout window matching the windows in the film strip to allow at least part of the image-forming beam to pass through to the viewing sensor.

In an alternate embodiment of the invention for use with individual sections of flat recording media such as photographic plates, a separate carrier is provided which has mounts for the sections of recording medium. Preferably, the carrier means is designed in the form of a link chain, the joints of which are situated between the mounts for the sections of recording media. If at least two joints are provided in this region, suitably spaced from one another, the carrier can be folded alternately so that the film mounts are vertically stacked in the supply and storage means, thereby occupying minimum space.

The invention will be explained in more detail with reference to the preferred embodiments shown in the drawings.

BRIEF DESCRIPTION OF THE DRAWINGS

FIG. 3 is a schematic side view of a portion of charged-particle beam equipment incorporating an alternate embodiment of the handling apparatus of the invention including a carrier means for individual film plates.

FIG. 4 is a top view of the carrier means of the embodiment of FIG. 3.

DESCRIPTION OF THE PREFERRED EMBODIMENTS

Figure 1:
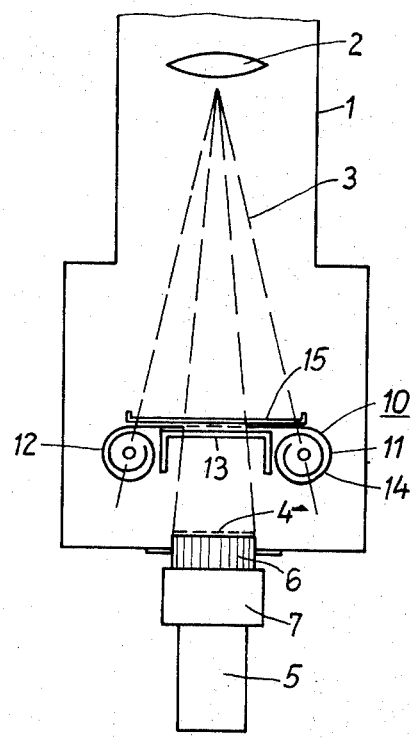
FIG. 1 is a schematic side view of a portion of charged-particle beam equipment incorporating an embodiment of the handling apparatus of the invention for use with roll film.

Referring to FIG. 1, conventional charged-particle beam equipment, for example an electron microscope, includes a vacuum chamber housing 1 enclosing a projection lens 2 for imaging an electron beam 3 upon a picture screen 4. In the particular equipment shown, picture screen 4 is scanned by a television camera 5 through a fiber objective 6 and an image intensifier 7, all of which are conventional. Alternatively, picture screen 4 could be a fluorescent screen for providing direct viewing by the operator.

A photographic film handling apparatus 10 is permanently mounted in the beam path between projection lens 2 and picture screen 4. Apparatus 10 includes a film carrier means such as a film strip 11 wound on a supply means such as spool 12. Film strip 11 is fed from spool 12 through a transport mechanism comprising a picture stage 13 to a storage means such as take-up spool 14. Film strip 11 is pressed aginst picture stage 13 by a pressure plate 15 to ensure that the film lies flat in the plane of focus of lens 2. Both picture stage 13 and pressure plate 15 have identical matching windows which allow a portion of electron beam 3, as indicated by the inner set of dashed lines, to pass through the transport mechanism to impinge on picture screen 4.

Figure 2:
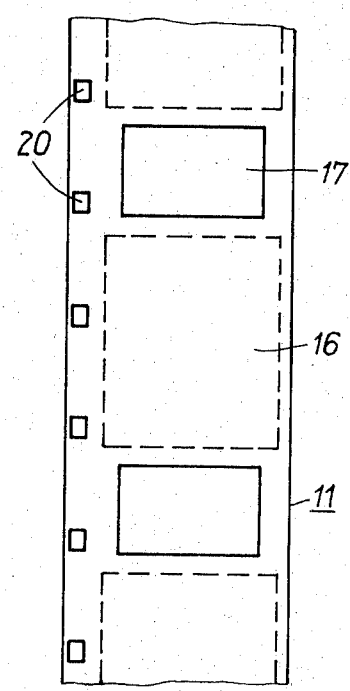
FIG. 2 is a top view of the roll film of FIG. 1 that serves as the carrier means of the invention.

FIG. 2 shows a portion of the film strip 11 used as a carrier means in the film handling apparatus shown in FIG. 1. Film strip 11 is arranged into consecutive picture areas 16, indicated by dashed outlines, separated by regions having punched-out windows 17 of shape and size identical to the windows of picture stage 13 and pressure plate 15. Along one edge of the film strip are spaced perforations 20 for engagement with the transport mechanism for moving the film strip in predetermined increments by drive means (not shown) as in conventional camera film advance devices.

FIG. 3 shows an alternate embodiment of the film handling apparatus of the invention for use with recording media packaged for individual pictures, e.g. photographic plates or flat film sections. In FIG. 3, like reference numerals refer to similar components of charged-particle beam equipment shown in FIG. 1. In place of the roll film handling apparatus 10 of FIG. 1, the embodiment of FIG. 3 comprises handling apparatus 30 which has a carrier 31 for feeding individual sections of recording media such as plates 34 from a supply means 32 through a transport mechanism (not shown) mounted in the path of charged-particle beam 3 to a storage means 33. The transport mechanism may include a picture stage similar to stage 13 in FIG. 1 for supporting carrier 31 in proper position in the path of electron beam 3.

Carrier 31 is shown in more detail in FIG. 4. The carrier is constructed in the manner of a link chain or belt and includes mounts for individual sections of a recording medium such as photographic plates 34, shown by dashed outlines. Between each plate 34 is an open space 35 corresponding to windows 17 in film strip 11 of FIG. 2, although not necessarily of the same dimensions. Chain links 36 join both edges of consecutive segments of carrier 31 by means of hinge pins 37 at each end. The length of links 36 is chosen to permit folding alternate plate-carrying segments of carrier 31 over by 180° so that the successive plates 34 can be arranged in space-saving vertical stacks in supply means 32 and storage means 33, as shown in FIG. 3. Wells or containers (not shown) can be provided for the stacks formed by the folded chain links in the supply and storage means to protect the film against unintended exposure by the electron beam.

A belt 38 running over motor-driven rolls 39 and 40 is studded with pins 41 and 42 which engage corresponding perforations of carrier 31 for advancing the carrier to place photographic plates 34 and open spaces 35 alternately in the path of beam 3.

A particular advantage of the chain-like carrier 31 is that it can be removed from vacuum chamber 1 after all the photographic plates 34 have been exposed and placed in a photographic devleoping device with the plates still mounted on it in proper sequence; so that the identity of the individual picturs can be maintained. For this application it is recommended that the carrier be made of stainless steel or a plastic which is impervious to photographic developing solutions. The plastic must also be conductive to avoid distorting the electron beam by stored static charges.

We claim:

1. In handling apparatus for supplying, transporting and storing media for recording images in charged-particle beam apparatus of the type that includes a supply means for sections of a recording medium, each section corresponding to a picture area, a transport mechanism positionable in a focal plane between a source of a charged-particle beam and a picture display sensing device for advancing the sections of the recording medium consecutively from the supply means into the path of the charged particle beam for exposure to the image generated by the beam, and means for storing the exposed sections of recording medium, the improvement comprising:

a carrier means for arranging the sections of recording medium in consecutive order for advancement into the focal plane of the charged-particle beam by the transport mechanism and for separating the consecutive sections of recording medium by open spaces to permit at least part of the beam to pass through the carrier means to strike the picture display sensing device when said open spaces are advanced into the beam path, said carrier means comprising an elongated strip of photographic film having picture areas alternating lengthwise with cutout windows for permitting at least a portion of the charged-particle beam to pass through the film strip when the windows are advanced into the beam path.

2. The handling apparatus of claim 1 wherein the transport mechanism comprises:

a picture stage positioned in the beam path for supporting the film strip in the focal plane of the beam, and a pressure plate for holding the film flat against the picture stage, both the picture stage and pressure plate having aligned windows matching the cutout windows in the film strip.

3. In handling apparatus for supplying, transporting and storing media for recording images in charged-particle beam apparatus of the type that includes a supply means for sections of a recording medium, each section corresponding to a picture area, a transport mechanism positionable in a focal plane between a source of a charged-particle beam and a picture display sensing device for advancing the sections of the recording medium consecutively from the supply means into the path of the charged-particle beam for exposure to the image generated by the beam, and means for storing the exposed sections of recording medium, the improvement comprising:

a carrier means for arranging the sections of recording medium in consecutive order for advancement into the focal plane of the charged particle beam by the transport mechanism and for separating the consecutive sections of recording medium by open spaces to permit at least part of the beam to pass through the carrier means to strike the picture display sensing device when said open spaces are advanced into the beam path, said carrier means comprising an elongated link belt having portions for mounting individual sections of the recording medium arranged in spaced relation along the length of the belt including pairs of parallel links joining consecutive mounting portions of the belt, each pair of links being spaced apart to permit at least a portion of the charged-particle beam to pass between them.

4. The handling apparatus of claim 3 wherein the individual sections of recording medium are photographic plates.

5. The handling apparatus of claim 3 wherein the length of each pair of links is such that successive mounting portions of the carrier means can be folded over alternately by 180° to permit stacking the sections of recording medium mounted on the carrier.

* * * * *